US006943924B2

(12) United States Patent
Marquet et al.

(10) Patent No.: US 6,943,924 B2
(45) Date of Patent: Sep. 13, 2005

(54) APPARATUS AND METHOD FOR DIGITAL HOLOGRAPHIC IMAGING

(75) Inventors: Pierre Marquet, Cheseaux sur Lausanne (CH); Etienne Cuche, Lignières (CH); Christian Depeursinge, Préverenges (CH); Pierre Magistretti, Lausanne (CH)

(73) Assignees: Ecole Polytechnique Federale de Lausanne (EPFL), Lausanne (CH); Universite de Lausanne /BRA, Lausanne (CH)

(*) Notice: Subject to any disclaimer, the term of this patent is extended or adjusted under 35 U.S.C. 154(b) by 0 days.

(21) Appl. No.: 10/497,312

(22) PCT Filed: Dec. 4, 2002

(86) PCT No.: PCT/CH02/00660

§ 371 (c)(1),
(2), (4) Date: Jun. 17, 2004

(87) PCT Pub. No.: WO03/048868

PCT Pub. Date: Jun. 12, 2003

(65) Prior Publication Data

US 2005/0036181 A1 Feb. 17, 2005

(30) Foreign Application Priority Data

Dec. 4, 2001 (CH) ............................. PCT/CH01/00701

(51) Int. Cl.[7] .................................................. G03H 1/02
(52) U.S. Cl. ............................... 359/9; 359/10; 359/11; 359/32; 382/210
(58) Field of Search ........................... 359/1, 9, 10, 11, 359/29, 32; 382/210

(56) References Cited

U.S. PATENT DOCUMENTS 6,249,349 B1 * 6/2001 Lauer ........................ 356/450

6,262,818 B1    7/2001 Depeursinge et al.
2004/0156098 A1 * 8/2004 Dubois et al. ............... 359/368

FOREIGN PATENT DOCUMENTS

EP    1 043 632    10/2000

OTHER PUBLICATIONS

Boyer et al, "Biomedical Three–Dimensional Holographic Microimaging at Visible, Ultraviolet and X–ray Wavelengths", Nature Medicine, Nature Publishing, Co., US, vol. 2, No. 8, Aug. 1996, pp. 939–941.

Dubois et al, "Improved three–dimensional imaging with a digital holography microscope with a source of partial spatial coherence", Applied Optics, Dec. 1, 1999, Opt. Soc. America, USA, vol. 38, No. 34, pp. 7085–7094.

* cited by examiner

*Primary Examiner*—Fayez G. Assaf
(74) *Attorney, Agent, or Firm*—Nixon & Vanderhye P.C.

(57) ABSTRACT

The present invention is related to a method for performing digital holographic imaging (DHI), said DHI being characterized by the fact that images of a sample are obtained by applying numerical means to reconstruct holograms of the sample. In the method of the invention, the sample is in a medium with controlled properties that influence the behaviour of the sample, and/or that influence the process of hologram formation. The information content of one hologram, or of a plurality of holograms, recorded with the sample in one medium, or in a plurality of medium, is used to reconstruct one image of the sample, or a plurality of images of the sample, that describe quantitatively one property of the sample, or a plurality of properties of the sample. The present invention is also related to an apparatus with which to perform said method.

29 Claims, 4 Drawing Sheets

APPARATUS AND METHOD FOR DIGITAL HOLOGRAPHIC IMAGING

This application is the U.S. national phase of international application PCT/CH02/00660 filed 4 Dec. 2002 which designated the U.S. and claims benefit of PCT/CH01/00701, dated 4 Dec. 2001, the entire content of which is hereby incorporated by reference.

FIELD OF THE INVENTION

The invention relates to digital holographic imaging (DHI) apparatuses and methods which provide an holographic representation of a sample.

STATE OF THE ART

Holography is a three-dimensional (3D) imaging technique that makes use of the interference between a reference wave and a wave emanating from the sample called object wave. The purpose of this interference is to record the phase of the object wave, which is related to the 3D character of the sample. With digital holographic imaging (DHI), real-time observations can be achieved by using a charged coupled device (CCD) camera as recording device and by performing a numerical reconstruction of the hologram. This idea has been proposed for the first time over 30 years ago by J. W. Goodmann, R. W. Lawrence, in "Digital image formation from electronically detected holograms," Appl. Phys. Lett, Vol. 11, 1967. As a result of technological progresses achieved in the fields of digital image acquisition and processing, this numerical or digital approach of holography has considerably extended the fields of its potential applications and different types of DHI-inspired imaging systems have been developed during the last years.

DHI techniques can be classified in two main categories: in-line techniques characterized by the fact that the reference and object waves have similar propagation directions, and off-axis techniques for which the two interfering waves propagates along different direction. The procedure for hologram formation in in-line digital holography is similar to the procedure used for phase measurements with so-called phase-shifting interferometric techniques. Hologram formation with in-line techniques requires the acquisition of several images, at least three, that must be recorded during a modulation of the reference phase. Off-axis techniques, are more simple from the experimental point of view since they require a single hologram acquisition without modulation of the phase of the reference wave. In-line techniques however present the advantage that the reconstructed images are free of twin images and zero order of diffraction. Among off-axis techniques, we can distinguish methods based on Fourier-transform holography, and methods based on a so-called Fresnel holography. With Fourier-transform methods the reference wave must be a spherical wave of precisely controlled curvature and image reconstruction is basically performed by Fourier transformation of the hologram. With Fresnel-holography based techniques, the reconstruction procedure is more sophisticated but more flexibility is offered to build experimental installations.

Among recent publications presenting developments or applications of DHI-inspired techniques, we can mention the following works. A study of some general performances of an in-line technique is presented in "Image formation in phase-shifting digital holography and application to microscopy", I. Yamaguchi et al., Applied Optics, Vol. 40, No. 34, 2001, pp. 6177–6186. In "Fourier-transform holographic microscope," Applied Optics, Vol. 31, 1992, pp. 4973–4978, W. S. Haddad et al describe the general principle of Fourier-transform DHI. Examples of applications of the Fresnel-based approach can be found in "Direct recording of holograms by a CCD target and numerical reconstruction," U. Schnars and W. Jüptner, Applied Optics, Vol. 33, 1994, pp. 179–181, and in "Performances of endoscopic holography with a multicore optical fiber," O. Coquoz et al., Applied Optics, Vol. 34, 1995, pp. 7186–7193.

A key element of a DHI method is the numerical method used for hologram reconstruction. An original reconstruction procedure, which allows for reconstructing simultaneously the amplitude and the phase of the object wave, on the basis of a single off-axis hologram acquisition, has been developed by Cuche et al and is presented in U.S. Pat. No. 6,262,218, and in WO 00/20929. Different applications and implementations of this technique are presented in "Digital holography for quantitative phase-contrast imaging", Optics Letters, Vol. 24, 1999, pp. 291–293, in "Simultaneous amplitude-contrast and quantitative phase-contrast microscopy by numerical reconstruction of Fresnel off-axis holograms", Applied Optics, Vol. 38, 1999, pp. 6994–7001, in "Spatial Filtering for Zero-Order and Twin-Image Elimination in Digital Off-Axis Holography", Applied Optics, Vol. 38 No. 34, 1999, in "Aperture apodization using cubic spline interpolation: Application in digital holographic microscopy", Optics Communications, Vol. 182, 2000, pp. 59–69, and in "Polarization Imaging by Use of Digital Holography", T. Colomb et al., Applied Optics, Vol. 38, No 34, 1999.

DHI method presents interesting possibilities of applications in cell biology. Indeed a living cell behaves optically as a phase object, i.e. a transparent sample whose constituents can be optically probed on the basis of the phase shift they induce on the light crossing them. The phase-shifting behavior of transparent sample is well known, and for a long time as it constitutes the mechanism of image formation in phase-contrast (PhC) and Nomarski (DIC) microscopy. Even though these two techniques are widely used in biological microscopy, and well suited as contrasting methods, they cannot be used for precise quantitative phase measurements. The DHI method instead, is reminiscent of classical interferometry, which is the most commonly used technique for phase measurements. However, whereas interferometric techniques are widely used in metrology, only few biological applications have been reported, by R. Barer and S. Joseph, in "Refractometry of living cells", Quarterly Journal of Microscopical Science, Vol. 95, 1954, pp. 399–423, by .R. Barer in "Refractometry and interferometry of living cells," Journal of the Optical Society of America, Vol. 47, 1957, pp. 545–556, by A. J. Coble et al. in "Microscope interferometry of necturus galiblader epithelium", Josiah Macy Jr. Fundation, New York, 1982, p. 270–303, by K. C. Svoboda et al in "Direct observation of kinesin stepping by optical trapping interferometry", Nature, Vol. 365, 1993, by J. Farinas and A. S. Verkman, in "Cell volume plasma membrane osmotic water permeability in epithelial cell layers measured by interferometry," Biophysical Journal, Vol. 71, 1996, pp. 3511–3522, by G. A. Dunn and D. Zicha in "Dynamics of fibroblast spreading," Journal of Cell Science, Vol. 108, 1995, pp. 1239–1249.

For biological applications, as well as for material science or metrology applications, DHI methods offer a novel alternative to classical interferometry with similar performances but simplified experimental procedures. The main advantage originates from the fact that complex and costly experimental optical devices can be handled by digital processing methods. For example, as described by E. Cuche et al. in "Simultaneous amplitude-contrast and quantitative phase-contrast microscopy by numerical reconstruction of Fresnel off-axis holograms", Applied Optics, Vol. 38, 1999, pp. 6994–7001, the wave front deformations appearing when a microscope objective is introduced along the path of the object wave can be compensated using a digital procedure.

This particular feature opens attractive possibilities in the fields of microscopy. In addition DHI techniques performs faster than interferomeric techniques, and provides more information about the sample, in particular, the amplitude and the phase of the object wave can be obtained simultaneously on the basis of a single hologram acquisition.

DHI methods have been applied to static imaging of biological cells, without phase reconstruction by K. Boyer et al. in "Biomedical three-dimensional holographic microimaging at visible, ultraviolet and X-ray wavelength", Nature Medecine, Vol. 2, 1996, pp. 939–941, and by F. Dubois et al. in "Improved three-dimensional imaging with a digital holography microscope with a source of partial spatial coherence," Applied Optics, Vol. 38, 1999, pp. 7085–7094. DHI of cells using a phase measurement modality requiring several image acquisitions has been reported by G. Indebetouw and P. Klysubun in "Saptiotemporal digital microholography," Journal of the Optical Society of America A, Vol. 18, 2001, pp. 319–325.

With DHI, image acquisition can be performed at videorate, and even faster using appropriate image acquisition systems, for experimental periods of up to several hours. Due to its interferometric nature, DHI has a high axial resolution (nanometer scale), which allows for observing subtle and minute modifications of sample shape, opening a wide field of applications in both life and material sciences.

A well-known limitation of interferometric techniques in general, and of DHI methods in particular, comes from the fact that the measured quantity, i.e. the phase of an electromagnetic radiation, can be simultaneously influenced by several factors. When an electromagnetic radiation interact with a sample, the result of this interaction, and in particular the changes occurring on the phase of the incident radiation, depends on three main classes of parameters:

a) Geometrical properties of the sample. The surface topography for a reflective sample imaged in reflection and the thickness of the sample for a transparent sample imaged in transmission.
  b) Dielectric properties of the sample. The absorption that influences the intensity of the radiation, and the index of refraction that modifies the phase of the radiation. Absorption and index of refraction are often combined in the concept of complex index of refraction.
  c) Dielectric properties of the medium incorporating the sample. It is only in the vacuum, or by approximation in the air, that an electromagnetic interaction depends only on the properties of the sample. In the general case, the dielectric properties of a sample must be defined relatively to the dielectric properties of the medium incorporating the sample. For example, its is not the absolute index of refraction of the sample ($n_s$) that must be considered, but the difference ($n_s - n_m$), where $n_m$ is the index of refraction of the medium incorporating the sample.

It is therefore often difficult to interpret data resulting from the measurement of the phase of an electromagnetic radiation. For example, if one wants to determine precisely and unambiguously the shape of a sample, the knowledge of the dielectric properties (of both the sample and the medium) is required. And if one wants to determine the dielectric properties of a sample, the shape of the sample and the dielectric properties of the medium must be known. A rigorous and unambiguous interpretation of the results can be obtained for example by taking dielectric property values from the literature, or by measuring the geometry or the dielectric properties of the sample with another technique.

OBJECTIVES OF THE INVENTION

The present invention aims at providing an apparatus and a method for performing digital holographic imaging (DHI) which consider the medium incorporating the sample as an active parameter of the image formation process. It is also an objective that such an apparatus and method improve the performances of DHI by providing more accurate measurements. It is another objective to study dynamic effects resulting from interactions between the sample and the incorporating medium. Finally, another objective is to provide more information about the sample, in particular concerning its geometrical and dielectric properties.

SUMMARY OF THE INVENTION

The present invention concerns an apparatus as defined in claim 1, a medium as defined in claim 6 and a method for performing digital holographic imaging (DHI) of a sample as defined in claim 7.

Some embodiments of the invention which relate to an apparatus are defined in subclaims 2 to 5. Other embodiments which relate to a method are defined in subclaim 8 to 13.

The invention is particularly useful with a method or a device as disclosed in PCT patent application WO 00/20929 and in particular with a device comprising an hologram creation device which includes a source of radiation, means to illuminate the sample unit with said radiation, means to create an object wave by collecting the radiation after interaction with the sample unit, means to create a reference wave from said radiation, means to produce a hologram by interference between said reference wave and said object wave, means to produce a digital hologram by acquiring and digitizing said hologram, arid means to transmit said digital hologram to said hologram reconstruction unit, and wherein said hologram reconstruction unit provides an amplitude-contrast image and/or a quantitative phase contrast image by numerical calculations applied to said digital hologram, and wherein said processing unit determine the dielectric properties of the sample and/or the shape of the sample by processing a plurality of said amplitude contrast images and/or a plurality of said quantitative phase-contrast images, and wherein said processing unit can also be used to describe the evolution of said sample by processing a plurality of said amplitude contrast images and/or a plurality of said quantitative phase-contrast images.

SHORT DESCRIPTION OF THE DRAWINGS

FIG. 3*a* schematically represent a biological cell in a perfusion chamber. FIG. 3*b* shows an example of a hologram of a biological cell. FIG. 3*c* shows an example of a quantitative phase-contrast image of a biological cell. FIG. 3*d* shows an example of a quantitative phase-contrast image of a biological cell presented in 3D perspective.

FIG. 4*a* shows an example of the evolution during time of the phase measured in a specific area of a cell. FIG. 4*b* shows an example of a quantitative phase-contrast image of a cell. FIG. 4*c* shows an example of a concentration-response curve established thanks to the present invention.

DETAILED DESCRIPTION OF THE INVENTION

Figure 1:
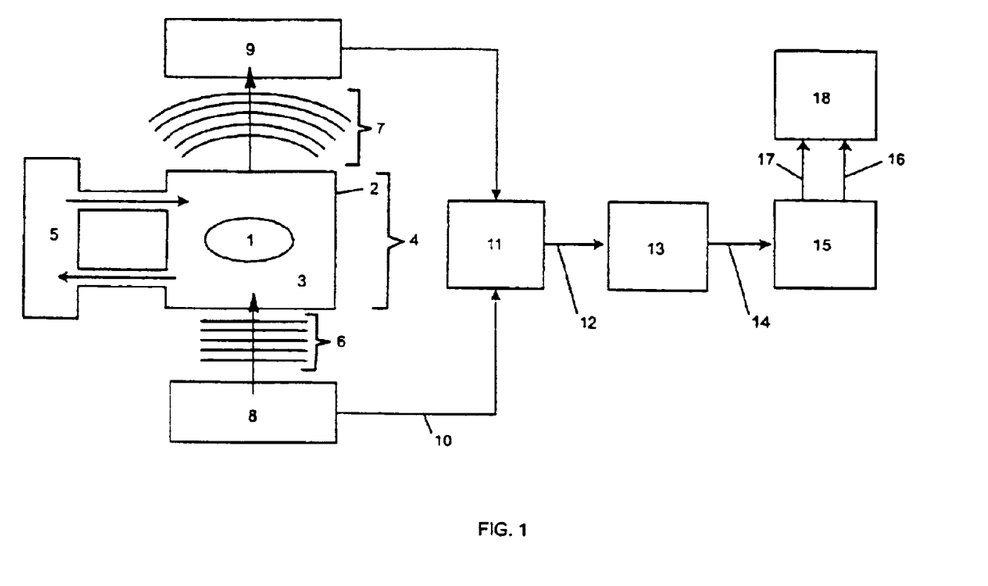
FIG. 1 is a schematic diagram showing the building block of an apparatus according to the present invention.

An important aspect of the invention is represented by the medium which includes the sample. As schematically shown in FIG. 1, this means that the sample 1 is located inside a given volume, defined for example by a container 2, filled with a medium 3. The sample unit 4 is composed of the sample 1, the container 2 and the medium 3. The medium 3 can be a gas, a liquid, a gel, a solid, a powder or a mixture of solid particles in suspension in a liquid. If the medium 3 is a gas, the container 2 is closed. If medium 3 is a liquid, the container 2 can also be closed, but the top face of the container 2 can be opened. If medium 3 is solid or a gel, container 2 is optional. For example, the sample 1 can be a living sample embedded in a physiological solution.

In particular, medium 3 may be composed of, or may comprise, elements that change the index of refraction of medium 3. For example, medium 3 can be a liquid element comprising different concentrations of molecules such as metrizamide ($C_{18}H_{22}I_3N_3O_8$), and/or different concentrations of manitol, and/or iohexol, and/or iodixanol, and/or ficoll, and/or percoll.

In particular, medium 3 may be composed of, or may comprise, elements that have dispersion properties, meaning that the dielectric properties of medium 3 are different for different wavelength of the electromagnetic spectrum. For example, medium 3 may comprise concentrations of an organic molecule, and/or of an inorganic molecule, and/or of a dye, and/or of a stain, and/or of a chromophore, and/or of pigments, and/or of a colloid, and/or of a neutral stain, and/or of a diazotic compound, and/or of a triphenylmethan compound, and/or of a xanthen compound, and/or of a aminoxanthen compound, and/or of a hydroxyxanthen compound, and/or of pyronyn, and/or of rhodamin, and/or of fluorescein, and/or of eosin, and/or of carbocyanin, and/or of oxadicarbocyanin, and/or of methylen blue, and/or of phthalocyanin, and/or of a ph-indicator element, and/or of sulforhodamin, and/or of trypan blue, and/or of thiazin, and/or of fast green FCF, and/or of evan's blue.

In particular, medium 3 may be a mixture of particles, micro- and/or nano-particles in particular, in suspension in a liquid. For example, these particles may be metallic particles, and/or dielectric particles, and/or coated particles, and/or gold particles, and/or silver particles, and/or copper particles, and/or silicon particles, and/or crystalline particles, and/or semi-conductors particles, and/or CdS particles, and/or CdSe particles, and/or latex beds, and/or charged particles, and/or colloidal gold particles, and/or silver particles.

A medium controller device 5 can be optionally used, more particularly if medium 3 is a gas or a liquid. The role of the medium controller device 5 is to permit exchanges of medium 3. When medium 3 is composed of a plurality of constituents, the medium controller device 5 can be used to change the concentration of one of these constituents, or of a plurality of these constituents. The medium controller device 5 can also comprise means to control the temperature, and/or the pressure of medium 3. It may also include means to control gas partial pressures such as oxygen or carbon dioxide. The medium controller device 5 can also comprise means, to induce electrical or magnetic stimulations of the sample 1 or of the entire sample unit 4. In particular, electrodes or electrode arrays may be included in the medium control device 5. The medium controller device 5 can also comprise means to induce a mechanical stimulation of the sample, for example a tip and a cantilever as performed in atomic force microscopy (AFM).

In particular, medium 3 may be a mixture of particles, micro- and/or nano-particles in particular, in suspension in a liquid, and the medium controller device 5 may be used to control the type of these particles, and/or the concentration of these particles, and/or the sizes of these particles.

When introduced in a set-up for digital holographic imaging (DHI), the sample unit 4 is illuminated by an incident radiation called illumination wave 6. After interaction with the sample unit, the incident radiation becomes the object wave 7. The incident radiation is provided by a radiation source 8, which emits preferentially radiations of the electromagnetic type. It is clear that to enable interaction between the sample 1 and the illumination wave 6, at least one face of container 2 comprises a zone that is transparent for the incident radiation.

The medium controller device 5 may comprise means, such as piezo-electric or acoustic transducers, to induce mechanical vibrations of the sample unit 4 or a vibration of medium 3. Such vibrations are expected to have a positive impact on the signal to noise ratio (SNR) of the method by inducing a random variation of the propagation directions of parasitic radiations emitted by elements of the container 2 that interact with the illumination wave 6.

The standard procedure for digital holographic imaging (DHI) is described for example in patent WO 00/20929. We just give here a summary of the most important steps of the DHI process. The object wave 7 is collected using appropriate means 9 (e.g. a lens, an assembly of lenses or a microscope objective), and appropriate means (e.g. an assembly beam splitters, mirrors, lenses and apertures) are used to produce a reference wave 10 from the radiation source 8. Appropriate means 11 (e.g. an assembly beam splitters, mirrors, lenses and apertures) are used to form a hologram 12 by making the reference wave 10, and the object wave 7., to interfere with each other. The hologram 12 is acquired by an image acquisition system 13, which transmit a digital hologram 14 to a hologram reconstruction unit 15. The reconstruction unit 15 applies numerical calculations to reconstruct an amplitude contrast image 16 and/or a quantitative phase contrast image 17. An additional processing unit 18 can be used to collect and to process a plurality of said amplitude contrast images and/or a plurality of said quantitative phase contrast images. The main function of the processing unit 18 is to provide results that are specific to the method of the present invention. In particular, the processing unit 18 can be used to describe the evolution of the sample 1 during time, and/or to provide measurements and a representation its dielectric properties, and/or to provide measurements and a representation of its thickness, and/or to provide measurements and a representation of its topography.

The processing unit 18 can also be used to improve the accuracy of the measurements by applying statistical procedure to a plurality of said amplitude contrast images 16 and/or to a plurality of said quantitative phase contrast images 17.

When a plurality of amplitude contrast images 16 and/or a plurality of quantitative phase contrast images 17 are provided during a given period of time, the processing unit 18 can be used to process temporal signals extracted from the plurality of amplitude contrast images 16 and/or the plurality of quantitative phase contrast images. For example, the processing unit can be used to Fourier-transform said temporal signals, and/or can be used to apply band-pass, and/or low-pass, and/or high pass filtering techniques to said temporal signal.

Alternatively a plurality of amplitude contrast images 16 and/or the plurality of quantitative phase contrast images 17 can be collected after successive modifications of the irradiation wavelength λ. If the holograms are recorded in the transmission geometry with a semi transparent sample, and provided that the dispersion law of the refractive index is known, a tomographic image of the sample can be obtained In another alternative a plurality of amplitude contrast images 16 and/or the plurality of quantitative phase contrast images 17 can be collected at variable incidence angles of the irradiating beam. This achievement can be obtained by rotating the sample. In another embodiment, the sample can be kept fixed and the irradiating beam can be moved in order to vary the incidence angle of the irradiating beam over the sample. The processing unit 18 can be used to operate a Radon transform of the collected data. Furthermore, such a mean can be operated to compute the local dielectric properties of the sample by applying an algorithm of backprojection. Fourier slice theorem in particular can be applied to the calculation of the dielectric potential of the sample.

In another alternative a plurality of amplitude contrast images 16 and/or the plurality of quantitative phase contrast images 17 can be collected after successive modifications of the irradiation wavelength $\lambda$ and after successive modifications of the incidence angles of the irradiating beam. The processing unit 18 can be used to compute the local dielectric properties of the sample by applying an algorithm. Fourier slice theorem as commonly applied in diffraction tomography.

The processing unit 18 can also be used to generate representations of the obtained results, for example by producing three-dimensional perspective representations of the obtained images, and/or by generating so-called false colors representations of the obtained images, and/or by generating movies or animations from a plurality of obtained images.

When a plurality of images are provided, the processing control unit can also be used to compare them which each other, for example in order to reveal the spatial distribution of signal changes.

The most important physical parameters describing a typical application of the present invention are:

- $\phi$ is the phase of the object wave 7, expressed in degree or in gradient. $\phi$ is provided by DHI as an image called quantitative phase-contrast image 17.
- $OPL=\phi\lambda/2\pi$, where $\lambda$ is the wavelength of the radiation. OPL is called optical path length. When $\phi$ is measured in degree, we have $OPL=\phi\lambda/360$.
- $n_m$ is the index of refraction, also called refractive index, of the medium incorporating the sample, or more precisely the index of refraction of medium 3.
- $n_s$ the index of refraction of the sample 1.
- d the thickness of the sample 1.
- h the height of the sample 1, which describes the topography of the sample.

All parameters described in the list above are provided in the form two-dimensional (2D) functions describing the spatial distribution of these parameters in a specific plane, or in other words in the form of images. It is clear when these images are provided in a digital form, the corresponding parameter can be measured from the values of the pixels composing the digital images.

In a transmission imaging geometry, which is characterized by the fact that the object wave 7 is collected after the illumination wave 6 has crossed the sample unit 7, the quantity measured in one pixel of said quantitative phase-contrast image 17 maps, the 2D distribution of the phase shifts induced by the sample 1 on the radiation crossing the sample 1. The corresponding OPL can be expressed as follows:

$$OPL=(n_s-n_m)d \quad (1),$$

Expression (1) clearly indicates that the measured signal depends on the structural properties of the sample (its thickness d), and on the difference between the dielectric properties of the sample, and the dielectric properties of the medium incorporating the sample ($n_s-n_m$ the difference of index of refraction).

In a reflection imaging geometry, characterized by the fact that the object wave 7 is collected after the illumination wave 6 has been reflected or backscattered by the sample, and if we consider only sample having surfaces with constant and homogeneous dielectric properties, the quantity measured in one pixel of said quantitative phase-contrast image depends on the surface topography of the sample and on the index of refraction of the medium incorporating the sample $n_m$. The corresponding OPL can be expressed as follows:

$$OPL=2n_m d \quad (2),$$

Expressions (1) and (2) gives only examples of expressions describing the behavior of OPL as a function of the specimen shape and dielectric properties. The present invention can also be applied determine the specimen shape and the dielectric properties of the specimen on the bases of more complex or more general models describing the interaction of an electromagnetic radiation with a specimen. In particular, such models can be obtained within the framework of the Maxwell equations, and/or within the framework of a vectorial or tensorial theory of electromagnetic interaction, and/or within the framework of the scattering potential equation, and/or within the framework of theoretical model describing the diffraction of an electromagnetic radiation by a specimen. It is also clear that such models may involve other dielectric properties than the refractive index, in particular the absorption, and/or the complex index of refraction. In particular such models may give more accurate results for small samples, and/or when the dielectric properties of the sample and the dielectric properties of medium are significantly different.

It is an object of the present invention that the proposed method and apparatus can be used to study the effect of a medium on the sample. In this case, the medium controller device 5 can be used to control the quantity of a given medium in the medium incorporating the sample. If this medium interact with the sample and induces OPL variations, theses OPL variations can be measured and monitored during time with DHI.

It is an object of the present invention that the medium incorporating the sample can be used to modulate the OPL signal measured by DHI. More particularly, and as clearly stated by expressions (1) and (2), changing $n_m$ has a direct influence on the measured OPL signal. In particular, for small or thin sample producing weak OPL signals, an OPL signal amplification can be achieved by increasing $n_m$ in reflection, or by increasing $n_s-n_m$ in transmission.

Changing $n_m$ the index of refraction of the medium incorporating the sample can be achieved by changing medium 3 using the medium controller device 5. In particular, the medium controller device 5 can be used to control the composition of medium 3, said composition comprising elements that changes the index of refraction of the medium. For example, medium 3 can be a liquid element comprising different concentrations of molecules or ions. For example medium 3 can comprise elements such as metrizamide ($C_{18}H_{22}I_3N_3O_8$), and/or manitol, and/or iohexol, and/or iodixanol, and/or ficoll, and/or percoll. For example, medium 3 can be a mixture of particles in suspension in a liquid, and the index of refraction of the medium 3 can be changed by changing the distribution of the sizes of these particles, and/or by changing the statistical distribution of the size of these particles, and/or by changing the concentration of these particles, and/or by changing the material of these particles.

It is an object of the present invention that the medium 3 enveloping the sample 1 may be composed of, or may comprise, an element having dispersion properties, meaning that the index of refraction of the medium incorporating the sample $n_m$ is different for different wavelength of the radiation. Therefore, $n_m$ can be changed by changing the wavelength $\lambda$ of the radiation illuminating the sample unit 4.

Figure 2:
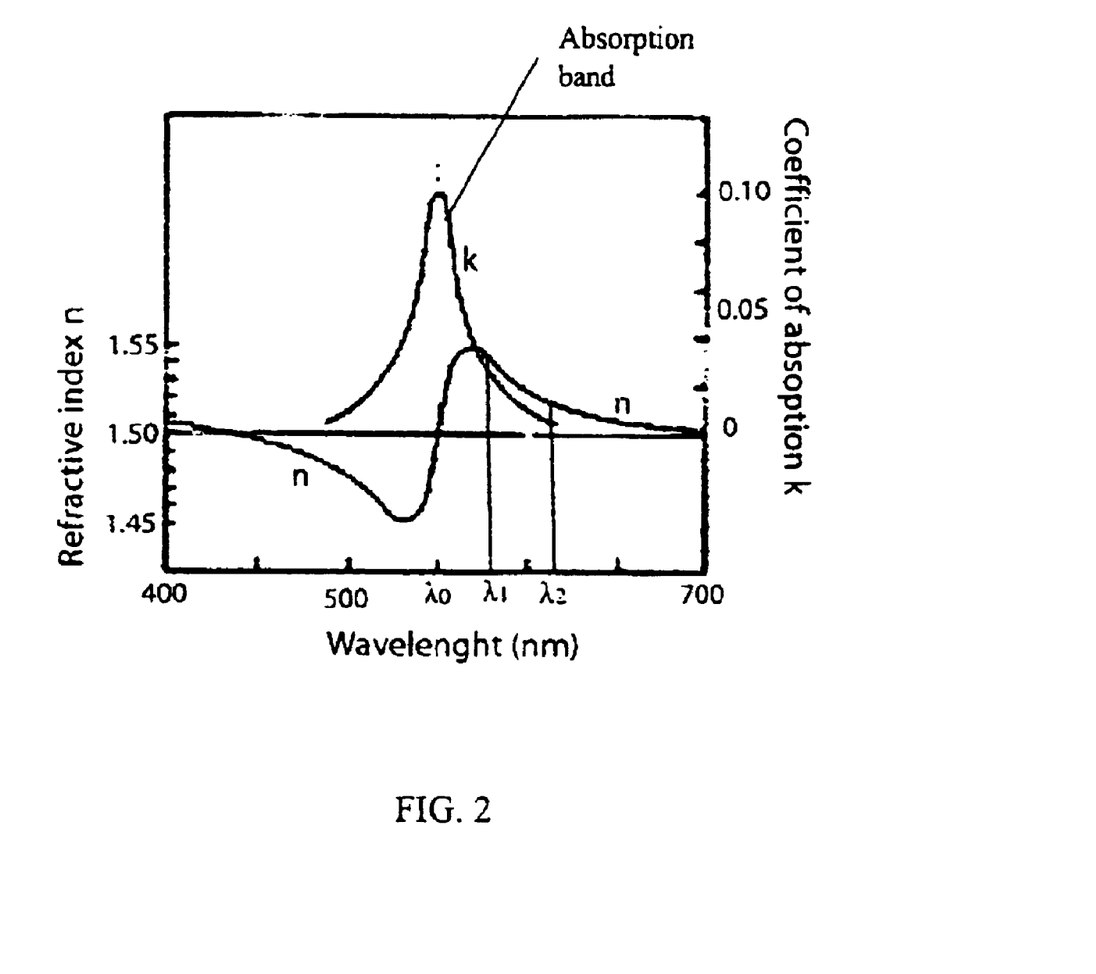
FIG. 2 refractive index (n) and absorption coefficient (k) behaviors near an absorption band.

For example the medium having dispersion properties can be characterized by an absorption spectrum showing absorption lines or absorption bands. According to the Kramers-Kronig relationship the dispersion behavior of such a medium, in a wavelength interval near an absorption line or near an absorption band, is characterized by the fact that important refractive index changes can occur even in small wavelength intervals. For example, as described in FIG. 2, two wavelengths $\lambda_1$ and $\lambda_2$, can be chosen so that they are located along the decreasing side of an absorption band, where dispersion effects are more pronounced. This enables fast and important modulations of $n_m$.

Particularly in the transmission imaging geometry, when a plurality of quantitative phase-contrast images have been obtained for different values of $n_m$, the thickness of the sample (d), and the index of refraction of the sample $n_s$, can be obtained separately or simultaneously, assuming that the different values of $n_m$ are known or have been measured previously. For example, lets define OPL1 and OPL2, two different OPL measurements performed for two different values of $n_m$, respectively $n_{m1}$ and $n_{m2}$. From expression (1), we have:

$$OPL1 = (n_s - n_{m1})d \quad (3),$$

$$OPL2 = (n_s - n_{m2})d \quad (4),$$

and $n_s$ and d can be directly determined as follows:

$$d = (OPL1 - OPL2)/(n_{m2} - n_{m1}) \quad (5),$$

$$n_s = (OPL2\, n_{m1} - OPL1\, n_{m2})/(OPL2 - OPL1) \quad (6).$$

Even if two image acquisitions are sufficient, more acquisitions can be performed for different values of $n_m$, or for the same value of $n_m$, for example in order to increase the accuracy of the measurements.

Different values of $n_m$ (for example the two values $n_{m1}$ and $n_{m2}$) can be obtained by changing the medium. Different values of $n_m$ (for example the two values $n_{m1}$ and $n_{m2}$) can also be obtained by using a medium having dispersion properties that allows to change its index of refraction by changing the wavelength of the radiation illuminating the specimen unit.

The invention can be used to measure $n_m$. In the transmission imaging geometry for example, if d and $n_s$, are known, $n_m$ can be determined as follows: $n_m = n_s - OPL/d$. More generally, the present invention can be used as a technique for refractometry when the geometry of the specimen is known.

The invention can also be used to obtain a tomography of the sample. Provided that $n_m$, can be chosen reasonably close to $n_s$ in order to avoid significant refraction effects, and provided that $n_m$, and $n_s$ don not vary to much over a distance comparable to the wavelength $\lambda$, in order to avoid significant diffraction effects, we have in a first approximation for a 2D geometry:

$$OPL(\theta, r) = \iint_{\substack{Specimen \\ unit}} dx\, dy\, n(x, y)\, \delta(x\cos\theta + y\sin\theta - r) \quad (7)$$

where n(x,y) is the local refractive index which is equal to $n_m$ outside the sample and approximately $n_s$ with local variations over the volume of the sample. $\delta$ is the Dirac delta distribution. OPL($\theta$,R) data can be obtained by collecting a plurality of amplitude contrast images 16 and/or a plurality of quantitative phase contrast images 17 can be collected at variable incidence angles $\theta$ of the irradiating beam. From the collected data the refractive index n(x,y) of the sample can be computed by applying an algorithm of back-projection.

If medium 3 may have no influences on the sample, the invention can be used to measure a property or a behavior of the medium 3. For example, if medium 3 is a liquid, the present invention can be used to study, or to observe, dynamics fluid phenomenon introducing local variations of OPL, flow analysis in particular, for example with flows tracers. For example, and more particularly when medium 3 is a solid or a gel, the present invention can also be used to analyze internal stresses inside the material.

As described by T. Colomb et al. in "Polarization Imaging by Use of Digital Holography", Applied Optics, Vol. 38, No 34, 1999, DHI can be used to image and to measure the polarization sate of the object wave. It is an object of the present invention that, in addition to amplitude-contrast images 16, and quantitative phase-contrast images 17, the polarization sate of the object wave, may be provided to the processing unit 18. In this case, the present invention can also be used to observe and to analyses processes that influence the polarization of the radiation, and in particular dynamic processes inducing transient modifications of the polarization. In this case for example, the medium 3 may have birefringent properties.

If a plurality of holograms are acquired during a period of time, the corresponding plurality of quantitative phase contrast images can be processed, for example by the processing unit 18, in order to compensate temporal variation of the OPL or phase signal, said temporal variations having other origins than the behavior of the sample, for example such temporal variation may be caused by mechanical vibrations of elements composing the apparatus used to generate holograms, and/or may be caused by air turbulences and/or may be caused by thermal effects. To compensate such temporal variations, the present invention uses a computer-based method that measures the phase signal in regions of the quantitative phase-contrast images where the sample has no influence on the OPL signal, or in other words in regions where d, or h, or $n_m$ have no influence on the measured signal. In such regions, OPL measurements provide a reference signal that monitor the influence of undesirable sources of signal variations. The compensation of the influence of these undesirable sources of signal variations can be performed by subtracting the reference signal from the signal measured in other area of the quantitative phase-contrast images, in particular in area where the sample influences the measured signal.

Within the general context of imaging and microscopy techniques, DHI methods in general, and the present invention in particular, appear as a powerful mean for real-time imaging of processes inducing dynamic changes of a sample shape and/or dynamic changes of physical properties of a sample. These dynamic changes may appear in relation to a spontaneous process and/or in relation to an induced process. For example, DHI methods can be applied to monitor the response of a sample to external perturbations of different forms, for example chemical perturbations, and/or biological perturbations, and/or electrical perturbations, and/or mechanical perturbations.

DHI methods in general, and the present invention in particular, present attractive possibilities for multifunctional imaging approaches combining DHI with other types of existing imaging techniques, and/or With other types of measurement techniques. For example, the present invention can be combined with fluorescence microscopy, or with laser scanning confocal microscopy, or with two-photon microscopy, or with second or third harmonic generation microscopy, or with atomic force microscopy. The present invention can also be applied in parallel with experimental techniques used in electrophysiology, and/or in fluid mechanics.

DHI techniques in general, and the present invention in particular, are particularly well adapted for non-invasive analysis, because no contrast agents are required, and because low radiation intensities are used. In particular, it has been established that the measured irradiance at the sample plane may be several orders of magnitude lower than the irradiance used for example by other microscopy or imaging techniques. It is therefore an interesting potential application of the present invention that the method can be applied to image delicate sample, and biological sample in particular. For example, the sample can be a biological cell, a living biological cell, a culture of biological cell, a mono-layer of cultured biological cells, a tissue composed of biological cell, a biochip, a preparations of proteins.

A particular aspect of the method according to the invention is characterized by the fact that the medium incorporating the sample can be changed during time and/or that properties of the medium incorporating the sample can be changed during time. Such changes of the medium are expected to induce modifications of the sample shape and/or modifications of the dielectric properties of the sample, and said modifications of the sample are monitored by DHI.

As a result of the high acquisition frequency of the DHI method, the method of the present invention is particularly well adapted to study the dynamics of fast sample-medium reactions. As DHI is also a non-invasive imaging technique working without contrast agents and with low radiation intensities, the method of the present invention is particularly well adapted to study the dynamic of reactions with minimized external perturbations, and during long time periods of hours or even days. This is of particular interest for applications in life sciences.

Figure 3:
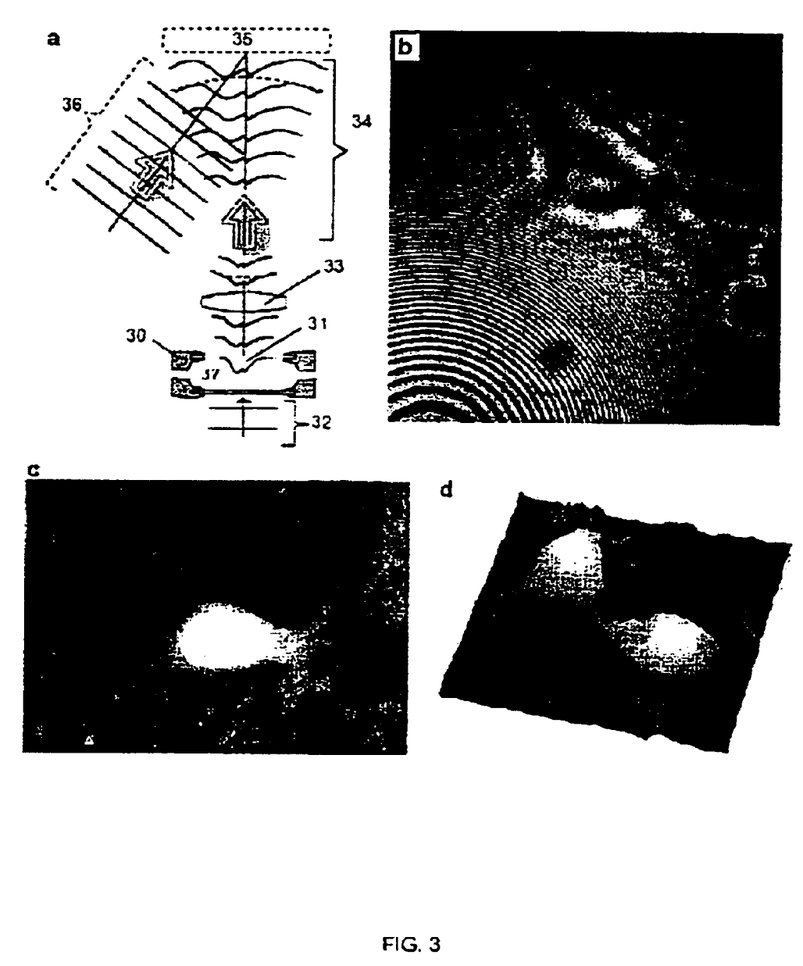
FIG. 3 presents an example of application of the method of the present invention.

FIG. 3 presents an example of application of the present invention to image living cells in culture enclosed in a perfusion chamber 30 filled with a physiological solution 37. As shown in FIG. 3a, the cell culture 31 is illuminated by an incident radiation 32 and a microscope objective 33 collects the transmitted radiation to form an object wave 34. A CCD camera 35 records the hologram. An example of hologram is presented in FIG. 3b. The hologram is produced by the interference with a reference wave 36. A numerical procedure is then applied to reconstruct the hologram. An example of quantitative phase-contrast image is presented in FIG. 3c. The obtained phase-contrast image can be presented in 3D perspective, as presented for example in FIG. 4d.

From the quantitative phase-contrast image, quantitative data about the cell morphology can be obtained. The refractive index, at the wavelength of 633 nm, of the perfused solution $n_m=1.3336\pm0.0002$, was measured with an Abbe refractometer. By assuming, in first approximation, a constant and homogeneous cellular refractive index $n_s=1.365$, one can estimate that an phase of 10 degree corresponds to a cellular thickness d=0.6 $\mu$m. Using this relation between phase and thickness, phase measurements extracted from specific pixels of the quantitative phase-contrast image presented FIG. 3c, yields a thickness of 1–3 $\mu$m for the neuronal processes and of approximately 8 $\mu$m for the cell body. Even with the assumption of a homogeneous distribution of intracellular refractive index (which can be discussed given a certain degree of heterogeneity of its constituents), these estimations of cell morphology give realistic values of typical cell dimensions as described in the literature for the mouse cortical neurons presented here. Using the same assumption for refractive index of the cell, and based on a phase measurement accuracy of 0.7 degree, that is dictated by experimental opto-mechanical noise, we obtain an axial (or vertical) resolution of 40 nanometers.

Figure 4:
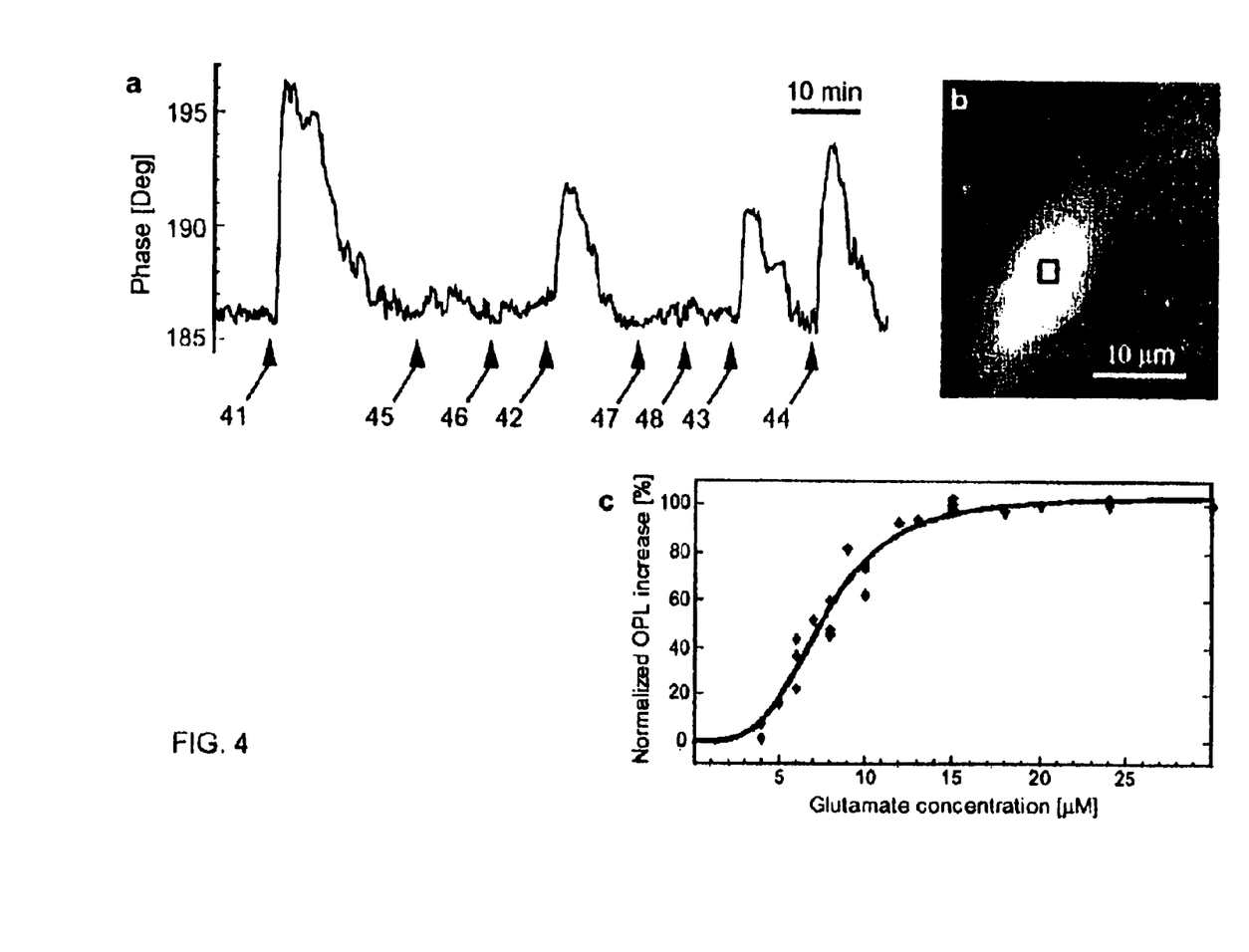
FIG. 4 presents an example of application of the method of the present invention.

As an example of application of the present invention, the present invention has been applied to study the effects of an excitatory neurotransmitter (glutamate) on the morphology of cultured mouse cortical neurons. The influence of glutamate on neuron morphology has been already described as resulting from excitotoxicity, for high concentrations (20–500 $\mu$M) and long exposures of several minutes. Thanks to its unique features, the method of the present invention has made possible the observation of reversible morphological changes occuring for short applications (a few seconds), at physiological concentrations ($EC_{50}=7.5$ $\mu$M). It has also been established that this effect occurs in response to the activation of N-methyl-D-aspartate (NMDA) receptors. Results of the real-time observation of glutamate-mediated morphological changes in neurons are summarized in FIGS. 4 and 5. FIG. 4a presents the temporal evolution of the phase signal measured, in real-time by DHI, in the domain delimited by a black rectangle in FIG. 4b, which presents a typical example of a quantitative phase contrast image of a living mouse cortical neuron immersed in a physiological solution. Cells were observed in a control solution (HEPES-buffered physiological solution) and pharmacological agents were applied as short pulses, of 20 seconds duration. These pulses of pharmacological agents are indicated by black triangles in FIG. 4a. Marked phase increases occur when glutamate (GLUT) is applied alone, at instants indicated by black triangles 41, 42, 43 and 44. The concentrations of GLUT, are respectively 15 $\mu$M, 10 $\mu$M, 15 $\mu$M and 20 $\mu$M. At instants indicated by black triangles 45 and 46, 400 $\mu$M of kynurenate (KYN), a broad spectrum ionotropic glutamate receptor antagonist, has been added to GLUT. No increase of the phase signal occurs in this case, indicating that the observed effect of GLUT is inhibited by KYN. The effect of GLUT is also inhibited when 5 $\mu$M of MK-801, an NMDA specific receptor antagonist, has been added to GLUT in the physiological solution, at instants indicated by black triangles 47 and 48. As can be seen in FIG. 4a, the application of glutamate pulses induced reversible OPL or phase increases lasting for several minutes. These OPL increases could be reproduced several times over periods of more than three hours. FIG. 4a shows also that these glutamate-mediated responses were inhibited by kynurenate, a broad-spectrum ionotropic glutamate receptor antagonist, and by MK-801, a specific NMDA receptor antagonist, thus stressing the receptor specific nature of the effect. A concentration-response curve (FIG. 4c) has been established on the basis of 5 different experiments. As response amplitudes vary from cell to cell, results were normalized with respect to the maximal response which occurred at a concentration of ~15 $\mu$M. Curve fitting using the Hill equation indicates a highly cooperative behavior (Hill coefficient= 3.75±0.4) with an $EC_{50}$ of ~7.5±0.23 $\mu$M. Interestingly, these results have been obtained in the presence of glycine (3 $\mu$M) in the perfusion solutions. Without glycine cells started to respond at glutamate concentrations higher than 15 $\mu$M and for only ~25% of cells (vs. ~80% in the presence of glycine). As glycine is an NMDA receptor co-agonist, this behavior further emphasizes the role these receptors in the glutamate-evoked responses. The maximum amplitude of a typical phase increase is ~10 degree representing ~5% of the initial cellular phase. If we assume once again a constant cellular refractive index ($n_s=1.365$), this corresponds to an increase in the vertical (z) axis of ~0.6 $\mu$m.

FIG. 4a shows an example of the evolution of the OPL averaged over a specific area of the sample, and gives only a partial idea of the real potential of the method of the present invention. With DHI, the spatial distribution of OPL can be defined, with a transverse resolution of for example 0.3 $\mu$m, and OPL time courses, such as presented in FIG. 4a, can be obtained for different micro-domains of the cell, or for each pixel of the quantitative phase-contrast image. The recorded signal can therefore be followed over time and space, for example by constructing animated sequences, for example by using the processing unit 18.

An informative way to characterize the observed effect consists in mapping the spatial distributions of OPL variations at different times. For the experiment presented in FIG.

4, this representation indicated that the observed cell morphology change is anisotropic. Indeed we have observed that OPL measurements presented a marked decrease along the cell boundaries, and a global increase over a central region of the soma, on top of heterogeneous local variations. If we consider an ellipse inside the cell body, the observed shape changes consisted in a reduction of its semi-minor axis, which enhances the cell eccentricity. Ten minutes after the end of a glutamate pulse application, we observed that small local OPL variations persist in some areas, even though the cellular OPL has globally recovered its initial level.

The high sensitivity of the present invention has revealed that glutamate applied during a few seconds at physiological concentrations induces reversible morphological changes mediated by NMDA receptors, in microdomains of mouse cortical neurons. These results demonstrate that the present invention is a new method that offers unique possibilities for real-time 3D functional imaging with a sub-cellular level of spatial resolution.

Morphological neuronal changes (following pharmacological medium applications: Glutamate, MK801.) have been monitored during a few hours. To optimize opto-mechanical stability during such periods of time the whole holographic microscope may be enclosed in a container. Despite this enclosure, different noise sources remain (such as coherent noise), extremely sensitive to opto-mechanical instabilities, which may perturb the reconstructed images. These residual noise sources render the quantitative analysis of neuronal morphology changes very difficult. To reduce the effects of these residual noise sources we have developed a device that generates and delivers a controlled energy in the area of the biological sample. This controlled energy may be mechanical vibrations and may be transmitted by perfusion line to the chamber.

The method of the present invention uses in priority a DHI technique to measure the phase of a radiation, and in particular the method described in patent WO 00/20929. However, it is evident that all the concepts described in the present invention, and in particular the fact that the sample is embedded in a medium, can be extended to other techniques for phase measurements. In particular, the present invention is also related to methods using phase measuring techniques such as in-line digital holography, or Fourier-transform digital holography, or digital heterodyne holography, or phase-shifting interferometric techniques. Considering that the concept of hologram is a generalization of the concept of interferogram, or that the concept of hologram is a particular example of interferogram, any kind of interferometric techniques can be used in principle, within the context of the present invention, as a mean to measure the phase of an electromagnetic wave.

REFERENCES

Patents

U.S. Pat. No. 6,262,218 Cuche et al.
WO 00/20929 Cuche et al

Other Publications

J. W. Goodmann and R. W. Lawrence "Digital image formation from electronically detected holograms," Appl. Phys. Lett, Vol. 11, 1967. pp.77–79.

Ichirou Yamaguchi et al. "Image formation in phase-shifting digital holography and application to microscopy", Applied Optics, Vol. 40, No. 34, 2001, pp. 6177–6186.

W. S. Haddad et al. "Fourier-transform holographic microscope," Applied Optics, Vol. 31, 1992, pp. 4973–4978.

U. Schnars and W. Jüptner, "Direct recording of holograms by a CCD target and numerical reconstruction," Applied Optics, Vol. 33, 1994, pp. 179–181.

O. Coquoz et al., "Performances of endoscopic holography with a multicore optical fiber," Applied Optics, Vol. 34, 1995, pp. 7186–7193.

E. Cuche et al., "Digital holography for quantitative phase-contrast imaging", Optics Letters, Vol. 24, 1999, pp. 291–293.

E. Cuche et al., "Simultaneous amplitude-contrast and quantitative phase-contrast microscopy by numerical reconstruction of Fresnel off-axis holograms", Applied Optics, Vol. 38, 1999, pp. 6994–7001.

E. Cuche et al., "Spatial Filtering for Zero-Order and Twin-Image Elimination in Digital Off-Axis Holography", Applied Optics, Vol. 38 No. 34, 1999.

E. Cuche et al., "Aperture apodization using cubic spline interpolation: Application in digital holographic microscopy", Optics Communications, Vol. 182, 2000, pp. 59–69.

T. Colomb et al., "Polarization Imaging by Use of Digital Holography", Applied Optics, Vol. 38, No 34, 1999.

R. Barer and S. Joseph, in "Refractometry of living cells", Quarterly Journal of Microscopical Science, Vol. 95, 1954, pp. 399–423.

R. Barer in "Refractometry and interferometry of living cells," Journal of the Optical Society of America, Vol. 47, 1957, pp. 545–556.

A J Coble et al. in "Microscope interferometry of necturus gallblader epithelium", Josiah Macy Jr. Fundation, New York, 1982, p. 270–303.

A C. Svoboda et al in "Direct observation of kinesin stepping by optical trapping interferometry ", Nature, Vol. 365, 1993.

J. Farinas and A. S. Verkman, in "Cell volume plasma membrane osmotic water permeability in epithelial cell layers measured by interferometry," Biophysical Journal, Vol. 71, 1996, pp. 3511–3522.

G. A. Dunn and D. Zicha in "Dynamics of fibroblast spreading," Journal of Cell Science, Vol. 108, 1995, pp. 1239–1249.

What is claimed is:

1. An apparatus for performing digital holographic imaging (DHI) of a sample, said apparatus comprising:
   an holographic creation unit,
   an holographic reconstruction unit,
   a processing unit,
   a sample unit including a container adapted to contain a medium in which a sample is contained,
   a medium controller unit comprising measuring means adapted to measure at least one parameter specific of said medium or at least one parameter specific of said sample, said medium being different from ambient air.

2. Apparatus according to claim 1 wherein said measuring means are adapted to measure the dielectric properties of said medium.

3. Apparatus according to claim 1 wherein said measuring means are adapted to measure the index of refraction of said medium.

4. Apparatus according to claim 1 wherein said measuring means are adapted to measure the dielectric properties of said sample.

5. Apparatus according to claim 1 wherein said measuring means are adapted to measure the index of refraction of said sample.

6. Apparatus according to claim 1 wherein said measuring means are adapted to measure the thickness of said sample.

7. Apparatus according to claim 1 wherein said measuring means are adapted to measure the surface topography of said sample.

8. Apparatus according to claim 1 furthermore comprising processing means adapted to process at least one parameter specific of said medium or one parameter specific of said sample.

9. Apparatus according to claim 8 wherein said processing means are adapted to process the dielectric properties of said medium.

10. Apparatus according to claim 8 wherein said processing means are adapted to process the index of refraction of said medium.

11. Apparatus according to claim 8 wherein said processing means are adapted to process the dielectric properties of said sample.

12. Apparatus according to claim 8 wherein said processing means are adapted to process the index of refraction of said sample.

13. Apparatus according to claim 8 wherein said processing means are adapted to process the thickness of said sample.

14. Apparatus according to claim 8 wherein said processing means are adapted to process the surface topography of said sample.

15. Apparatus according to claim 1 comprising a medium controller unit adapted to modify or to regulate the medium properties, including the partial or complete medium exchange of a medium in which a sample is contained.

16. Apparatus according to claim 1 comprising vibrating means for mechanically vibrating at least a part of the sample unit.

17. Apparatus according to claim 16 wherein said vibrating means are incorporated in the medium controller unit.

18. Method for performing digital holographic imaging (DHI) of a sample contained in a medium, said method comprising the following steps:

producing at least one hologram by interference between at least one reference wave and at least one object wave, producing at least one digital hologram by acquiring and digitizing at least one hologram, reconstructing at least one amplitude contrast image and/or at least one quantitative phase contrast image by numerical reconstruction of at least one digital hologram, said method being furthermore characterized by the following step:

processing of at least one amplitude contrast image and/or processing of at least one quantitative phase contrast image in order to determine at least one parameter of the sample and/or in order to determine at least one parameter of the medium.

19. Method according to claim 18 wherein at least one parameter of the medium is modified during time and wherein a plurality of holograms are produced and processed in order to obtain a plurality of amplitude contrast image and/or a plurality of quantitative phase, and wherein said a plurality of amplitude contrast image and/or said a plurality of quantitative phase contrast image are processed in order to describe the temporal evolution of at least one parameter of the sample.

20. Method according to claim 18 wherein at least one parameter of the medium is modified during time and wherein a plurality of holograms are produced and processed in order to obtain a plurality of amplitude contrast image and/or a plurality of quantitative phase, and wherein said a plurality of amplitude contrast image and/or said a plurality of quantitative phase contrast image are processed in order to describe the temporal evolution of at least one parameter of the medium.

21. Method according to claim 18 wherein the medium and the sample interact with each other resulting in a modification of at least one parameter of the sample and/or in a modification of at least one parameter of the medium.

22. Method according to claim 18 wherein the medium is a dispersive medium and wherein the values of the dielectric properties of the medium are changed by changing the wavelength of the radiation illuminating the sample, and wherein changing the wavelength of the radiation illuminating the sample results in a modification of at least one parameter of the sample and/or in a modification of at least one parameter of the medium.

23. Method according to claim 18 wherein said parameter of the sample is the thickness of the sample.

24. Method according to claim 18 wherein said parameter of the sample is the surface topography of the sample.

25. Method according to claim 18 wherein said parameter of the sample is a dielectric property of the sample.

26. Method according to claim 18 wherein said parameter of the sample is the index of refraction of the sample.

27. Method according to claim 18 wherein said parameter of the medium are the dielectric properties of the medium.

28. Method according to claim 18 wherein said parameter of the medium is the index of refraction of the sample.

29. Method according to claim 18 wherein the dielectric properties of the medium are adjusted in order to increase or to decrease the contrast of the amplitude contrast image and/or in order to increase or to decrease the contrast of the quantitative phase contrast image.

* * * * *